May 12, 1925.

R. L. NEUBERT 1,537,368

BEARING BOX

Filed Jan. 26, 1922

Inventor
Richard L. Neubert
By Cyrus Kehr
Attorney

May 12, 1925.
R. L. NEUBERT
1,537,368
BEARING BOX
Filed Jan. 26, 1922
2 Sheets-Sheet 2
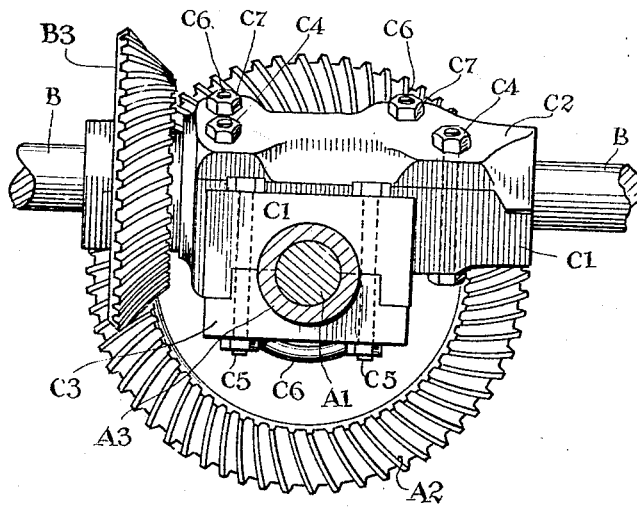
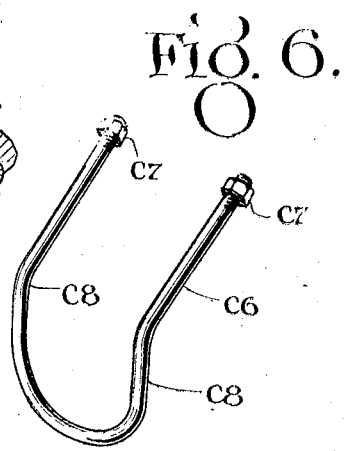
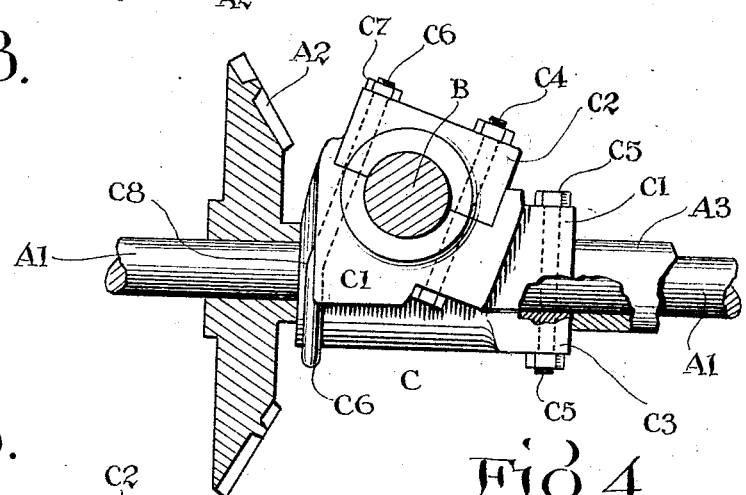
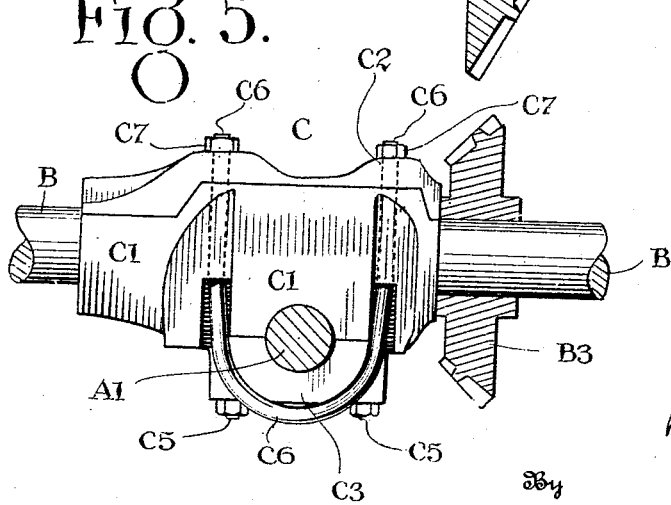
Inventor
Richard L. Neubert
By Cyrus Kehr
Attorney Patented May 12, 1925.

1,537,368

UNITED STATES PATENT OFFICE.

RICHARD L. NEUBERT, OF KNOXVILLE, TENNESSEE.

BEARING BOX.

Application filed January 26, 1922. Serial No. 531,998.

*To all whom it may concern:*

Be it known that I, RICHARD L. NEUBERT, a citizen of the United States, residing at Knoxville, in the county of Knox and State of Tennessee, have invented a new and useful Improvement in Bearing Boxes, of which the following is a specification, reference being had to the accompanying drawing.

My improvement relates particularly to bearing boxes adapted to receive two shafts or axles which cross each other. In the form hereinafter described my improvement is applied to such a bearing box having a single body and two caps or cap plates, one of said caps being located at one side and the other at the other side of said body and said caps being at right angles to each other.

The object of my improvement is to provide more effective and more durable and convenient means for securing said caps to said body. In the form of such bearings heretofore used, each of said caps has been fastened to the body by two bolts extending through the body and the cap and by two stud bolts threaded into the body and extending through the adjacent part of the cap and receiving nuts outside of the cap. One of the uses of such bearings has been on logging locomotives for connecting a longitudinal power transmission shaft to the transverse axles of the trucks of the locomotive. Large power is transmitted through said transmission shaft to the axles, and consequently there is large strain on the bearings and on the bolts whereby the caps are intended to be held in place. In practice, the stud bolts above-mentioned frequently break. It has been found that if one of those bolts breaks, additional strain is put upon the companion stud bolt which is applied to the same cap, and that then that second bolt also breaks. And in most cases the fracture of the stud bolts is close to the body of the bearing. When such breakage occurs, the locomotive must be raised and the truck removed. Then the pieces of the broken stud bolts must be removed and new bolts inserted. Usually the removal of these pieces is difficult and tedious, the part of the stud bolt remaining seated in the body of the bearing being difficult to engage for removal. Sometimes it must be removed by drilling.

I regard the fracture of these stud bolts as being due to the fact that they are short and are so seated as to concentrate strains and vibrations on the bolt close to the face of the body of the bearing. The bolts which extend through the body and one of the caps are longer and in them there is no such concentration of strains or vibrations, and those bolts seldom break. The object of my improvement is to eliminate the short stud bolts and substitute bolts which will have such length as to avoid concentration of strains in one part of the bolts. For the four short stud bolts I have substituted one long U-bolt.

In the accompanying drawings,

Fig. 3 is an upright section on the line, 3—3, of Fig. 2, looking in the direction of the arrow;

Fig. 4 is an upright section on the line, 4—4, of Fig. 2, looking in the direction of the arrow;

Fig. 5 is an upright section on the line, 5—5, of Fig. 2, looking in the direction of the arrow;

Fig. 6 is a perspective of the U-bolt which extends through the body of the bearing and engages the two cap plates.

Figure 1:
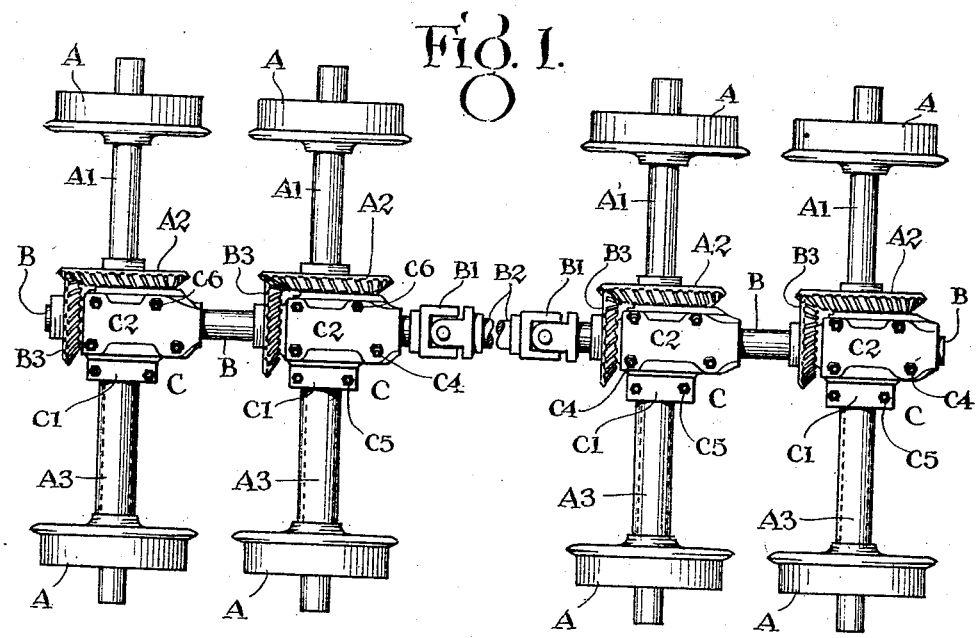
Fig. 1 is a plan showing parts of two trucks of a logging locomotive, the middle section of the power transmission shaft being broken away.

Referring to said drawings, A, A are track wheels, and $A^1$, $A^1$ are axles supported by said wheels. The four wheels and the two axles at the right in Fig. 1 belong to one truck of a logging locomotive, and the four wheels and the two axles at the left in the same figure belong to another truck of the same locomotive. On each truck is a horizontal power transmission shaft extending crosswise over the two axles of that truck. Between said shafts is a middle section, $B^2$, of the transmission shaft (partially broken away) which has its ends joined to the shafts, B, by means of universal couplings, $B^1$. Power is applied to the middle section, $B^2$, in the well known manner, for rotating said shaft.

At each axle a double bearing box, C, surrounds the axle and also the transmission shaft, B. And adjacent each side bearing box a gear wheel, $B^3$, surrounds and is fixed to the transmission shaft and meshes with a gear wheel, $A^2$, which surrounds and is fixed to the adjacent axle, $A^1$. These two gear wheels are of skew bevel form.

The bearing box, C, comprises a middle body, $C^1$, and an upper cap or cap plate, $C^2$, and a lower cap or cap plate, $C^3$, and the bolts whereby said body and said caps are held to each other.

Figure 2:
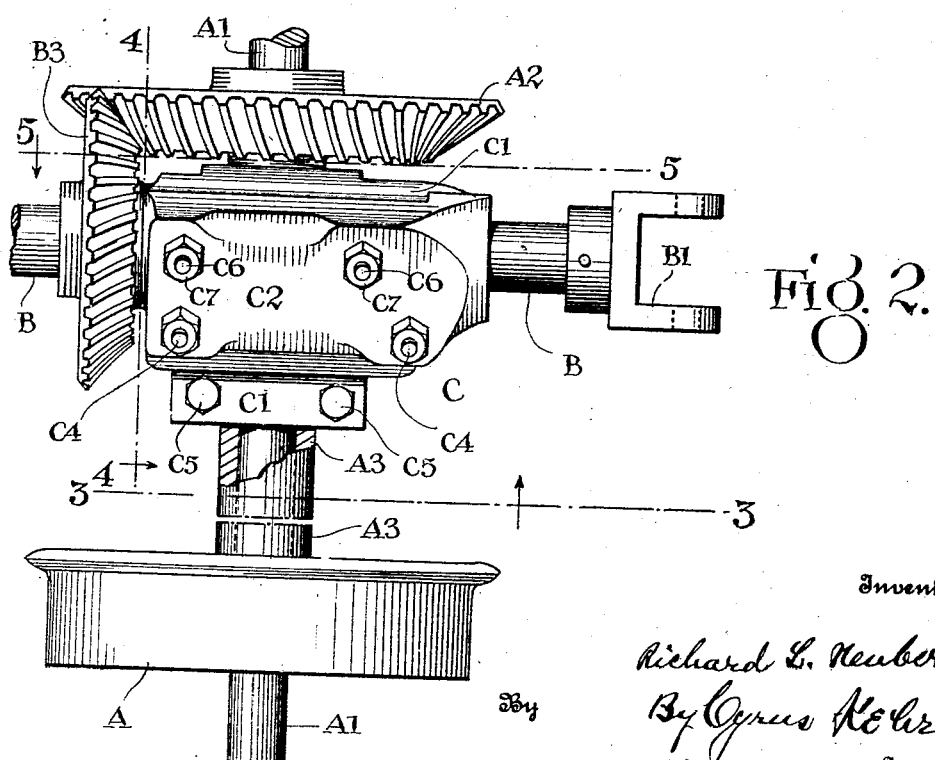
Fig. 2 is a detail plan of the right hand part of the left hand truck of Fig. 1, one of the track wheels being omitted and other parts being broken away.

The bevel gear wheel, $A^2$, is placed close to the transmission shaft, B, in order that the bevel gear wheel, $B^3$, which meshes with the wheel, $A^2$, need not be objectionably large—it is preferably smaller than the wheel, $A^2$. In order that the wheel, $A^2$, may thus be near the transmission shaft, the part of the body, $C^1$, of the bearing box which lies between said wheel and said shaft is of relatively limited thickness. But at the opposite side of the transmission shaft, the body, $C^1$, is extended along the axle, $A^1$, far enough to project beyond the upper cap, $C^2$, whereby room is made for inserting two ordinary bolts, $C^5$, downward through the body and through the adjacent end of the lower cap. (See Figs. 2 and 4). The wheel, $B^3$, is similarly placed close to the axle, and the body, $C^1$, is in the same manner extended along said shaft, whereby room is made for inserting two ordinary bolts, $C^4$ and $C^6$, upward through the body and the upper cap, $C^2$. Thus it will be seen that the body, $C^1$, has two extensions or arms at right angles to each other, whereby the body is made L-shape. And it will be seen that each cap is elongated to reach over one of the body extensions, whereby said caps lie at right angles to each other and each extends beyond the other to permit extending bolts through the body and one of the caps.

The lower face of the body, $C^1$, is in a horizontal plane or parallel to the axle, $A^1$, and to the transmission shaft, B. The upper face of the body, $C^1$, is in an inclined plane or parallel to the transmission shaft but inclined to the axle, $A^1$, the high part being next to the bevel gear wheel, $A^2$. Thus the seating of the caps is in planes which are inclined to each other. The lower edge of the upper cap is secured by ordinary bolts, $C^4$, which extend upward through the body, $C^1$, and through the upper cap, the nuts being on the upper face of the cap. The lower face of the part of the cap, $C^3$, which is adjacent the bevel gear wheel, $A^2$, is rounded. A U-bolt, $C^6$, surrounds said part of said cap and extends upward through the body, $C^1$, and through the upper cap, $C^2$, the nuts, $C^7$, for said bolt being on the upper face of the upper cap. On account of the inclination of the upper cap, each arm of the U-bolt is bent at, $C^8$, (Figs. 4 and 6), in order that the parts of the U-bolt arms which lie in the body, C, and the cap, $C^2$, may be straight. Below said bend, the body, $C^1$, is cut away to receive the U-bolt.

Movement of the bearing box away from the bevel gear wheel, $A^2$, is prevented by a spacing sleeve, $A^3$, surrounding the axle, $A^1$, at the side of the bearing opposite the wheel, $A^2$, and extending to the adjacent track wheel, A.

It will be noted that the U-bolt engages both caps and that said bolt is relatively long. In a locomotive to which I have applied this improvement, the total length of the U-bolt is about 30 or 36 inches, the longer part of the bearing box being about 16 inches and said box weighing about 150 or 160 pounds. The U-bolt takes the place of the four stud bolts previously used. On the trucks of such a locomotive which I have operated, the stud bolts frequently broke, and much labor and time were required for replacing the broken bolts. After substituting the U-bolts, the locomotive has been operated several months without breaking the U-bolts nor the ordinary bolts.

I claim as my invention,

1. In a structure of the kind described, the combination with an axle and a shaft and a body and an upper cap and a lower cap forming bearings transverse to each other, of means extending through the body and engaging both said caps, and additional means for separately binding said caps to said body, substantially as described.

2. In a structure of the kind described, the combination with an axle and a shaft and a body having upper and lower faces in planes inclined to each other and an upper cap and a lower cap forming bearings transverse to each other, of means extending through the body and engaging both said caps, and additional means for separately binding said caps to said body, substantially as described.

3. In a structure of the kind described, the combination with an axle and a shaft and a body and an upper cap and a lower cap forming bearings transverse to each other, of a U-bolt extending through the body and engaging both of said caps, and additional means for separately binding said caps to said body, substantially as described.

4. In a structure of the kind described, the combination with an axle and a shaft and a body having upper and lower faces inclined to each other and an upper cap and a lower cap forming bearings transverse to each other, of a U-bolt extending through the body and engaging both of said caps, and additional means for separately binding said caps to said body, substantially as described.

5. In a structure of the kind described, the combination of an axle, wheels on the axle, a drive shaft crossing the axle, a body, an upper cap, a lower cap, means extending through the body and engaging both said caps, additional means for separately binding said caps to said body, and a spacing sleeve surrounding said axle, substantially as described.

In testimony whereof I have signed my name, this 23rd day of January, in the year one thousand nine hundred and twenty-two.

RICHARD L. NEUBERT.